March 8, 1932. E. W. SEEGER 1,848,847
CONTROLLER FOR ELECTRIC MOTORS
Filed May 11, 1931
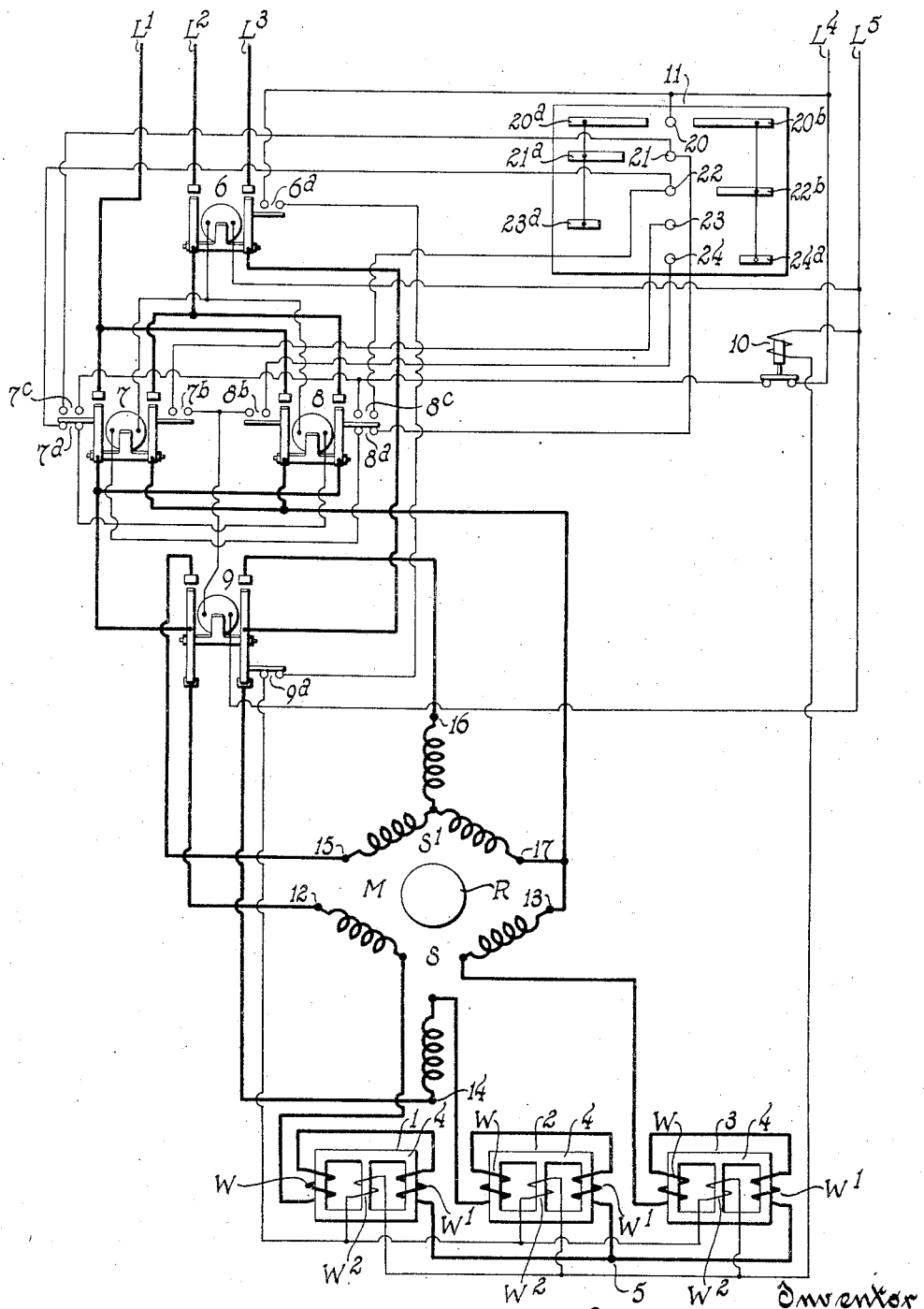

Patented Mar. 8, 1932　　　　　　　　　　　　　　　　　　　1,848,847

UNITED STATES PATENT OFFICE

EDWIN W. SEEGER, OF WAUWATOSA, WISCONSIN, ASSIGNOR TO CUTLER-HAMMER, INC., OF MILWAUKEE, WISCONSIN, A CORPORATION OF DELAWARE

CONTROLLER FOR ELECTRIC MOTORS

Application filed May 11, 1931. Serial No. 536,323.

This invention relates to improvements in controllers for electric motors.

Controllers embodying the invention are particularly advantageous for control of elevator motor of the A. C. two speed type.

In the control of such motors difficulty has been experienced in effecting smooth slow down and stopping, and the present invention has among its objects to overcome such difficulty.

A further object is to provide a controller affording smooth acceleration as well as deceleration through employment of the same instrumentalities.

A further object is to provide a controller which in operation is more quiet than controllers heretofore employed.

Other objects and advantages of the invention will hereinafter appear.

According to the present invention it is proposed to include in circuit with the slow speed winding of the motor reactors having direct current coils to produce a varying effect of such reactors subject to time control inherent in the building up of the magnetic flux of the direct current coils.

The accompanying drawing illustrates diagrammatically an embodiment of the invention, which for simplicity of illustration has omitted therefrom numerous refinements which ordinarily would be employed in practice. It is to be understood that the embodiment illustrated is susceptible of various modifications without departing from the scope of the appended claims.

Referring to the drawing there is illustrated a motor M of a type commonly used in elevator service, said motor comprising a squirrel cage rotor R, a three phase slow speed stator winding S and a three phase high speed stator winding $S^1$. The windings S and $S^1$ are supplied with current from a 3 phase circuit comprising lines $L^1$ $L^2$ and $L^3$.

Each phase of the slow speed winding has in circuit therewith coils of one of the reactors 1, 2 and 3. The three reactors are of like construction, each comprising a magnetic frame 4, preferably of the form illustrated with coils W and $W^1$ wound on the end portions and a coil $W^2$ wound on the central portion. The coils W and $W^1$ of each reactor are connected in series between a terminal of the winding S and a star point 5 for the several sections of the winding S. The coils $W^2$ constitute the direct current coils for the reactors, the same being connected in parallel to be supplied from a direct current source comprising lines $L^4$—$L^5$. This type of reactor is well known, and as will be understood its reactance value decreases as the flux of the direct current coil increases, such increase in flux being gradual and affording a time element as aforementioned.

The control means illustrated provides for starting of the motor by excitation of the winding S with the coils $W^2$ of the reactors initially deenergized. On the other hand, the control means provides for completing the circuits of the coils $W^2$ when the motor circuit is completed whereby the reactors will be caused to function to increase gradually the torque of the motor. Further the control means after bringing the motor up to high speed provides for reinclusion of the slow speed winding in stopping and for energization of the coils $W^2$ thereafter to effect gradual increase in the dynamic braking of the motor, the motor circuit being automatically interupted after lapse of a given time.

The control means comprises a double pole main switch 6, double pole direction switches 7 and 8, a double throw slow-fast switch 9 and a relay 10, all supplied with direct current from lines $L^4$ and $L^5$, switches 6, 7, 8 and 9 being under the control of a master switch 11. Also the control means comprises a number of interlocks afforded by auxiliary contacts of switches 6, 7, 8 and 9.

Assuming the slow-fast switch 9 to be in the position illustrated, and further assuming closure of main switch 6 and direction switch 7 circuit may be traced from terminal 12 of slow speed winding S through the left hand pole of switch 9, to and through the left hand pole of switch 7 to line $L^1$; from motor terminal 13 through the right hand pole of switch 7 and the left hand pole of switch 6 to line $L^2$ and from motor terminal 14 through the right hand pole of switch 9 to and through the right hand pole of switch 6 to line $L^3$.

Further assuming response of the slow-fast switch 9 the circuit of the slow speed winding S is opened and circuit may be traced from terminal 15 of the high speed winding to and through the left hand poles of switches 9 and 7 to line $L^1$; from motor terminal 16 through the right hand poles of switches 9 and 6 to line $L^3$ and from motor terminal 17 through the right hand pole of switch 7 and left hand pole of switch 6 to line $L^2$. Thereby provision is made for operation of the motor in one direction at either slow speed or high speed. With direction switch 8 closed circuit may be traced from terminal 12 of the slow speed winding or terminal 15 of the high speed winding through the left hand pole of switch 9 to and through the right hand pole of switch 8 to and through the left hand pole of switch 6 to line $L^2$; from terminal 13 of the slow speed winding or terminal 17 of the high speed winding to and through the left hand pole of switch 8 to line $L^1$ and from terminal 14 of the slow speed winding or terminal 16 of the high speed winding through the right hand pole of switch 9 to and through the right hand pole of switch 6 to line $L^3$. Thereby provision is made for operation of the motor in an opposite direction at either slow speed or high speed.

The master controller 11 provides for control of the switches 6, 7, 8 and 9 in the following manner.

When the master switch is moved to engage contacts 20—$20^a$ and 21—$21^a$ circuit is completed from line $L^4$ through auxiliary down contacts $8^a$ of switch 8 to and through the winding of switch 7 and thence to and through the winding of switch 6 to line $L^5$. On the other hand, when the master switch is moved to engage contacts 20—$20^b$ and 22—$22^b$ circuit is completed from line $L^4$ to and through auxiliary down contacts $7^a$ of switch 7 to and through the winding of switch 8 and thence through the winding of switch 6 to line $L^5$. Thus provision is made for energizing the main switch and the direction switches selectively according to the direction of movement of the master switch, the direction switches being interlocked to insure against response of either except when the other is in open position. Movement of the master switch to engage contacts 23—$23^a$ completes circuit from line $L^4$ through auxiliary up contacts $7^b$ of switch 7 to and through the winding of the slow-fast switch 9 to line $L^5$. Movement of the master switch to engage contacts 24—$24^a$ completes circuit from line $L^4$ through auxiliary up contacts $8^b$ of switch 8 to and through the winding of the slow-fast switch 9 to line $L^5$. Thus the slow-fast switch may be energized by movement of the master switch in either direction, but only after closure of the proper direction switch.

The relay 10 has normally engaged contacts which complete maintaining circuits for the direction switches and the main switch. Assuming the main switch 6 and direction switch 7 to be energized, a maintaining circuit may be traced from line $L^4$ through relay 10 to and through auxiliary up contacts $7^c$ of direction switch 7 to contact 21 of the master switch and thence through the windings of switches 7 and 6 as heretofore explained. On the other hand, with the main switch 6 and direction switch 8 closed a maintaining circuit may be traced from line $L^4$ through relay 10 and the auxiliary up contacts $8^c$ of switch 8 to contact 22 of the master switch and thence through the windings of switches 8 and 6 as heretofore explained. Thus whenever the master switch is thrown to off position while the motor is operating, the main switch and the effective direction switch are maintained energized until the relay 10 is caused to respond to disengage its contacts.

The direct current coils $W^2$ of the reactors and the winding of relay 10 have a common circuit controlled by auxiliary contacts $6^a$ of main switch 6 and auxiliary contacts $9^a$ of the slow-fast switch 9, the arrangement being such that the main switch must be closed and the slow-fast switch in down position for slow speed operation of the motor in order to energize said windings. With the switches 6 and 9 in the positions stated circuit may be traced from line $L^4$ through the auxiliary contact $6^a$ of main switch 6, thence to and through the auxiliary contacts $9^a$ of the slow-fast switch 9 to and through the coils $W^2$ in parallel and thence to and through the winding of relay 10 to line $L^5$.

As will now be apparent, if the motor is operated at high speed the auxiliary contacts $9^a$ of the slow-fast switch will be disengaged, with the result that the coils $W^2$ of the reactors will be denergized and the relay 10 likewise deenergized. Accordingly should the master switch be thrown to off position the main switch and the effective direction switch will be maintained energized while the slow-fast switch will be deenergized, causing reengagement of its auxiliary contacts $9^a$ to complete circuit through the coils $W^2$ of the reactors and the winding of relay 10. This will cause the reactors to function for gradual slowdown of the motor and will effect response of relay 10 after a lapse of time to deenergize the main switch and the effective direction switch, the relay 10 having a time element corresponding to that of the reactors.

It will of course be understood that the time element of relay 10 may if desired be increased by employment of any one of numerous well known expedients, and that the time element of the reactors may be varied in any one of numerous well known ways. Among the expedients for varying the time element of the type of reactor shown may be mentioned provision of a copper tube around the D. C. core, slotting of the core or employment of resistance in circuit with the D. C. coil, such resistance, if desired, being commutable for a varying effect therof. Also it is to be understood that reactors might if desired be similarly employed in the circuit of the high speed winding of the motor.

What I claim as new and desire to secure by Letters Patent is:

1. The combination with an alternating current motor having separate slow speed and high speed windings, of reactors in circuit with the slow speed winding of said motor, said reactors having direct current coils for varying their reactance value, and means for stopping said motor when operating at high speed, comprising means to establish the circuits of said slow speed winding and of said direct current coils of said reactors.

2. The combination with an alternating current motor having separate slow speed and high speed windings, of reactors in circuit with the slow speed winding of said motor, said reactors having direct current coils for varying their reactance value and means for stopping said motor when operating at high speed, comprising means to establish the circuits of said slow speed winding and of said direct current coils of said reactors and also means to disconnect said motor from circuit after lapse of a given time.

3. The combination with an alternating current motor having separate slow speed and high speed windings, of reactors in circuit with the slow speed winding of said motor, said reactors having direct current coils for varying their reactance value and means for stopping said motor when operating at high speed, comprising means to establish the circuits of said slow speed winding and of said direct current coils of said reactors, and also comprising a relay to effect disconnection of said motor after lapse of a given time, said relay having a control winding connected in series with said direct current coils of said reactors.

4. The combination with an alternating current motor having slow speed and high speed windings to be energized selectively, of reactors in circuit with the slow speed winding of said motor, said reactors having direct current coils for varying their reactance value, and starting and stopping means for said motor utilizing the slow speed winding of said motor for acceleration and also for slow down in stopping, said means comprising means to effect energization of the direct current coils following connection of said slow speed winding for acceleration or slow down.

5. The combination with an alternating current motor having slow speed and high speed windings to be energized selectively, of reactors in circuit with the slow speed winding of said motor, said reactors having direct current coils for varying their reactance value, and starting and stopping means for said motor utilizing the slow speed winding of said motor for acceleration and also for slow down in stopping, said means comprising means to effect energization of the direct current coils following connection of said slow speed winding for acceleration or slow down and further comprising means to disconnect said motor from circuit after lapse of a given time following initiation of slow down.

6. The combination with an alternating current two speed motor, of means, including a slow-fast switch, to start said motor, to commutate the windings of said motor for slow speed or high speed operation and to stop said motor, and reactors included in circuit with certain of the motor windings, said reactors having direct current coils controlled by said means to render energization of said coils dependent upon completion of the motor circuit and a given setting of said slow-fast switch.

7. The combination with an alternating current two speed motor, of means to effect starting of said motor, to commutate the windings of said motor for slow speed operation or high speed operation and to stop said motor, said means including means to reestablish slow speed connections incident to stopping when said motor is operating at high speed and to disconnect said motor automatically subject to a given time delay, and reactors included in the slow speed connections of said motor, said reactors having direct current coils dependent for energization upon given settings of parts of said first mentioned means whereby energization of said coils follows establishment of slow speed connections.

In witness whereof, I have hereunto subscribed my name.

EDWIN W. SEEGER.